US009730014B2

(12) United States Patent
Balaban et al.

(10) Patent No.: US 9,730,014 B2
(45) Date of Patent: Aug. 8, 2017

(54) SYSTEMS, METHODS, AND DEVICES FOR LTE, WI-FI, AND BLUETOOTH COEXISTENCE

(71) Applicant: Intel IP Corporation, Santa Clara, CA (US)

(72) Inventors: Nir Balaban, Tel Aviv (IL); Keren Dor, Herzelyia (IL); Ido Ouzieli, Tel Aviv (IL); Ignacio Gimeno, Valbonne (FR); Bruno Jechoux, Antibes (FR); Assi Jakoby, Herzelia (IL); Dongsheng Bi, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 116 days.

(21) Appl. No.: 14/579,402

(22) Filed: Dec. 22, 2014

(65) Prior Publication Data

US 2016/0183282 A1    Jun. 23, 2016

(51) Int. Cl.
| H04W 4/00 | (2009.01) |
| H04W 4/02 | (2009.01) |
| H04W 72/00 | (2009.01) |
| H04W 72/12 | (2009.01) |
| H04W 64/00 | (2009.01) |

(52) U.S. Cl.
CPC .......... *H04W 4/021* (2013.01); *H04W 4/008* (2013.01); *H04W 4/025* (2013.01); *H04W 64/00* (2013.01); *H04W 72/1215* (2013.01); *H04W 72/1226* (2013.01)

(58) Field of Classification Search
CPC . H04W 4/008; H04W 4/021; H04W 28/0236; H04W 72/082; H04W 72/12; H04W 72/1226; H04W 72/1231; H04W 72/1263; H04W 72/1278; H04W 74/02; H04W 74/04; H04W 80/04; H04W 84/02; H04W 84/042; H04W 84/12
See application file for complete search history.

(56) References Cited

U.S. PATENT DOCUMENTS

| 8,428,010 | B2 * | 4/2013 | Huang | .................. | H04W 48/18 |
| | | | | | 370/328 |
| 8,681,660 | B2 * | 3/2014 | Xu | ....................... | H04J 11/0023 |
| | | | | | 370/255 |
| 8,737,924 | B2 * | 5/2014 | Fu | ........................ | H04B 1/1027 |
| | | | | | 455/296 |
| 8,750,926 | B2 * | 6/2014 | Fu | .......................... | H04B 1/406 |
| | | | | | 370/229 |
| 8,787,293 | B2 * | 7/2014 | de la Broise | ..... | H04W 72/1215 |
| | | | | | 370/329 |
| 8,830,985 | B2 * | 9/2014 | Xu | ....................... | H04J 11/0023 |
| | | | | | 370/350 |

(Continued)

*Primary Examiner* — Alpus H Hsu
(74) *Attorney, Agent, or Firm* — Eversheds Sutherland (US) LLP (57) ABSTRACT

Methods, devices and systems for dynamic scheduling of Wi-Fi or Bluetooth signals based at least in part on LTE schedules are disclosed. In some examples, Wi-Fi or Bluetooth can perform coexistence decisions including Wi-Fi and Bluetooth channel or Adaptive Frequency Hopping (AFH) selection based on modem calculated Rx or Tx indications and device geo location, maximum allowed transmit power per channel for Wi-Fi, and the LTE modem connection state.

24 Claims, 8 Drawing Sheets

(56) References Cited

U.S. PATENT DOCUMENTS

| | | | | |
|---|---|---|---|---|
| 8,831,655 B2* | 9/2014 | Burchill | H04W 52/243 | 370/310 |
| 8,879,999 B2* | 11/2014 | Cai | H04B 1/109 | 455/41.2 |
| 8,908,571 B2* | 12/2014 | Hart | H04J 11/0023 | 370/280 |
| 8,914,019 B1* | 12/2014 | Choi | H04W 72/048 | 455/422.1 |
| 8,929,196 B2* | 1/2015 | Novak | H04B 17/0077 | 370/208 |
| 8,989,778 B2* | 3/2015 | Altman | H04L 63/102 | 455/411 |
| 9,060,280 B2* | 6/2015 | Koo | H04W 16/14 | |
| 9,131,531 B2* | 9/2015 | Belghoul | H04W 88/06 | |
| 9,185,684 B2* | 11/2015 | Cai | H04W 72/02 | |
| 9,232,443 B2* | 1/2016 | Fu | H04B 1/406 | |
| 9,258,833 B2* | 2/2016 | Bitran | H04W 16/14 | |
| 9,363,824 B2* | 6/2016 | Jung | H04L 5/0037 | |
| 2008/0123610 A1* | 5/2008 | Desai | H04L 47/14 | 370/339 |
| 2012/0060158 A1* | 3/2012 | Kadous | H04W 72/1215 | 718/100 |
| 2012/0077532 A1* | 3/2012 | Kadous | H04W 16/14 | 455/507 |
| 2012/0164948 A1* | 6/2012 | Narasimha | H04W 72/1215 | 455/63.1 |
| 2012/0329515 A1* | 12/2012 | Husted | H04W 52/226 | 455/552.1 |
| 2013/0072135 A1* | 3/2013 | Banerjea | H04B 1/525 | 455/83 |
| 2013/0196673 A1* | 8/2013 | Smadi | H04W 56/001 | 455/450 |
| 2013/0301420 A1* | 11/2013 | Zhang | H04W 76/048 | 370/241 |
| 2014/0140381 A1* | 5/2014 | Sang | H04B 1/406 | 375/219 |
| 2014/0185494 A1* | 7/2014 | Yang | H04W 56/0005 | 370/280 |
| 2014/0313910 A1* | 10/2014 | Appleton | H04L 1/20 | 370/252 |
| 2014/0328290 A1* | 11/2014 | de la Broise | H04W 72/1215 | 370/329 |
| 2014/0334330 A1* | 11/2014 | Baghel | H04L 1/188 | 370/252 |
| 2015/0087301 A1* | 3/2015 | Choudhary | H04W 48/16 | 455/434 |
| 2015/0163680 A1* | 6/2015 | Valliappan | H04W 16/14 | 370/329 |
| 2015/0163752 A1* | 6/2015 | Appleton | H04W 52/243 | 370/252 |
| 2016/0037536 A1* | 2/2016 | Hamzeh | H03M 13/353 | 370/329 |
| 2016/0044516 A1* | 2/2016 | Hedayat | H04W 16/14 | 370/329 |
| 2016/0080958 A1* | 3/2016 | Rinne | H04W 24/10 | 370/338 |

* cited by examiner

SYSTEMS, METHODS, AND DEVICES FOR LTE, WI-FI, AND BLUETOOTH COEXISTENCE

TECHNICAL FIELD

Example and non-limiting embodiments disclosed herein relate generally to wireless communication systems, methods, devices and, more specifically, relate to coexistence in wireless communication systems and devices.

BACKGROUND

Communication systems typically operate in accordance with one or more communication standards. Wireless communication systems may operate in accordance with one or more standards including, but not limited to, Institute of Electrical and Electronics Engineers (IEEE) 802.11, Wi-Fi Direct, Bluetooth, advanced mobile phone services (AMPS), digital AMPS, global system for mobile communications (GSM), code division multiple access (CDMA), local multipoint distribution systems (LMDS), multi-channel-multi-point distribution systems (MMDS), time division multiple access (TDMA) systems, frequency division multiple access (FDMA) systems, 3GPP Long Term Evolution (LTE) systems, and orthogonal frequency division multiple access (OFDMA) systems.

Some advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., Wi-Fi), Bluetooth, LTE, and the like.

BRIEF DESCRIPTION OF THE DRAWINGS

The embodiments, features, and aspects of the present disclosure will become more apparent from the detailed description set forth below when taken in conjunction with the drawings in which like reference characters identify correspondingly throughout and wherein.

DETAILED DESCRIPTION

Embodiments of certain systems, methods, and devices can provide coexistence in wireless communication systems and devices, such as a mobile device operating in a networked wireless communication environment or system. An example mobile device can include an LTE User Equipment (UE), such as a fourth generation (4G) mobile phone. Such a 4G phone may include various radios to provide a variety of functions for the user. For purposes of this example, the 4G phone can include an LTE radio for voice and data, an IEEE 802.11 (Wi-Fi) radio, a Global Positioning System (GPS) radio, and a Bluetooth radio, where two or more of the above may operate simultaneously. While the different radios provide useful functionalities for the mobile device, their inclusion in a single device can lead to coexistence issues because the connectivity chips may be collocated with the cellular modem in the mobile device. When a collocated cellular radio, such as LTE, is operating in a frequency band close to Wi-Fi or Bluetooth band, significant interference can be present between the two systems due to limited physical separation. Specifically, operation of one radio may in some cases interfere with operation of another radio through radiative, conductive, resource collision, and/or other interference mechanisms. Coexistence issues can include such interference.

Figure 1:
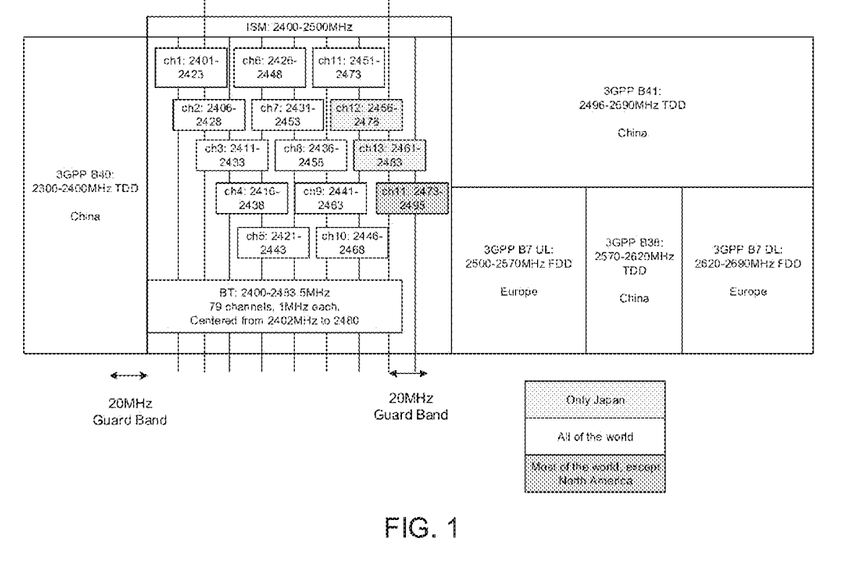
FIG. 1 illustrates an example of Wi-Fi, Bluetooth, and adjacent LTE bands.

In certain instances, coexistence issues can be present in the LTE uplink channel, which is adjacent to the Industrial Scientific and Medical (ISM) band and may cause interference therewith. It should be noted that Bluetooth and some Wireless LAN (WLAN) channels fall within the ISM band, and FIG. 1, for example, illustrates a Bluetooth and an adjacent LTE band. It should be noted that LTE has two variants; Time-Division Duplex (TDD) and Frequency-Division Duplex (FDD). As it can be seen from FIG. 1, LTE B7 FDD bands uplink (UL) is adjacent to the ISM band and the downlink (DL) is on the upper side of the ISM band, which is planned to be used in Europe. Similarly, LTE B40 TDD band, which is planned to be used in China, is on the lower side of the ISM band and the band ends at 2.4 GHz where the ISM band starts. LTE B41 TDD band lies on the upper side of the ISM band, which is planned to be used in China and Korea. Similarly, LTE B38 TDD band is on the upper side of the ISM band. In some instances, a Bluetooth error rate can become unacceptable when LTE is active in some channels of Band 40 or even Band 7 for some Bluetooth channel conditions. LTE transmissions may degrade or even block the Wi-Fi or Bluetooth reception in some or all of the channels. Consequently, simultaneous operation with Bluetooth can result in disruption in voice services terminating in a Bluetooth headset. Such disruption may be unacceptable to the consumer.

With reference specifically to LTE, it is noted that a UE, such as a mobile phone, communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal may interfere with a Bluetooth signal or WLAN signal. However, such interference may not be reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE can include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

In one instance, where a LTE TDD and Bluetooth are coexistent, the Bluetooth transmission (Tx) may affect LTE downlink (DL) and LTE uplink (UL) may affect Bluetooth reception (Rx). In yet another instance, where a LTE FDD and Bluetooth are coexistent, LTE uplink (UL) may affect Bluetooth Rx, for example.

In order to manage communication via multiple radios and avoid collisions and/or interference between respective radios, a dynamic scheduling means can be utilized to coordinate between respective radios that are in collision, e.g., radios configured such that their mutual operation would cause significant interference on at least one of the radios.

The following description with reference to the accompanying drawings is provided to assist in a comprehensive understanding of embodiments of the disclosure as defined by the claims and their equivalents. It includes various specific details to assist in that understanding but these are to be regarded as merely example. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station or another mobile station. An access point may also be referred to as an access node, a base station or some other similar terminology known in the art. An access point may also be called a mobile station, a user equipment (UE), a wireless communication device or some other similar terminology known in the art. Both communication station and the access point may simply be referred to as a device in the present disclosure.

Figure 2:
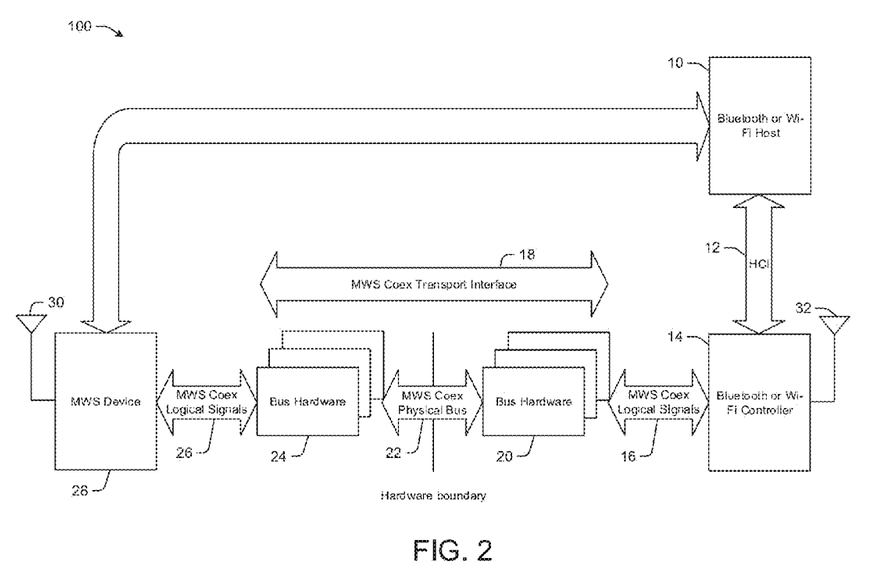
FIG. 2 illustrates example coexistence architecture of a wireless communication device, according to one or more example embodiments.

FIG. 2 illustrates an example wireless communication device 100, according to one embodiment of the present disclosure. Device 100 may have the illustrated infrastructure to facilitate a coexistence case including a Mobile Wireless Standards radio 30, such as, for example, a LTE radio, and a Bluetooth or Wi-Fi radio 32. The collocated Mobile Wireless Standards device 28 and the Bluetooth or Wi-Fi device or controller 14 may be configured to exchange one or more real time (RT) traffic messages through, for example, a Mobile Wireless Standards (MWS) Coex Physical Bus interface 22. One or more messages, as described herein, may include a LTE Tx or a LTE Rx or LTE frame information, which may be transferred from LTE or MWS device 28 to a connectivity chip, such as, for example a Bluetooth or Wi-Fi connectivity chip. According to one or more example embodiments, Bluetooth or Wi-Fi controller 14 may indicate high priority traffic to the LTE or MWS device 28 and expect LTE or MWS device 28 to yield in a MWS Coex Transport interface 18 in order to avoid conflicts. However, in the case of a Non Real Time (NRT) interface, the messages may be routed through a Bluetooth or Wi-Fi host interface 10 where status information, such as, for example LTE operation band and channels, may be exchanged. Wireless communication device 100 may also include bus hardware 20 to enable communication of MWS Coex logical signals 16, 26 between the devices 14, 28 and the MWS Coex physical bus 20, for example. Additionally, wireless communication device 100 may include a Host Controller Interface (HCI) architecture, wherein a HCI 12 may enable communication between the Bluetooth or Wi-Fi host 10 and the Bluetooth or Wi-Fi controller 14, as shown in FIG. 2, for example. The HCI 12 may, for example, provide a command interface to the baseband controller 14 and Bluetooth or Wi-Fi host 10, access to configuration parameters, and a uniform method of accessing the Bluetooth or Wi-Fi baseband capabilities.

The example interface described above may allow the Mobile Wireless Standards device 28 and the Bluetooth or Wi-Fi device or controller 14 to exchange information and support cooperative coexistence. However, due to network restriction of the LTE system, in the event there is a conflict or arbitration between the two devices, for example, when one device is attempting to send a signal during the reception period of the other device, the system may prefer the LTE device. Collisions can occur when one interface or device receives a packet while another collocated interface or device is transmitting. Collisions may produce one or more bit errors in the received packet data, corrupted data and packet loss. As such, in a typical scenario, less than 10% of LTE traffic is affected and whenever there is interference between the two devices, Bluetooth or Wi-Fi device is most likely to be adversely affected. For example, either the Bluetooth Tx is lost or the Bluetooth Rx gets adversely affected. This may result in, for example, performance degradation due to the wireless communication device 100 attempting multiple retransmissions.

According to one or more example embodiments, in a RT scenario the LTE or MWS device 28 may provide information on its Downlink (DL) and Uplink (UL) activity in advance and may be synchronized with the LTE subframe boundaries DL/UL respectively. The decision point of whether to use the subframe may be done at a fixed time location relative to the subframe boundary. By using the LTE decision point knowledge and knowing the subframe boundary, and LTE frame structure, Bluetooth device 14 may be able to deduce better futuristic information in advance notice time in comparison to the one achieved by only using the knowledge of LTE frame subframe and LTE UL/DL advance indications.

LTE UE may schedule its RF traffic according to eNB's assignments. It may, for example, have the knowledge ahead of the actual transmissions. The LTE device may, for example, notify its actual traffic with known offsets to other radio devices in the same system. As described herein, the LTE decision point may be a notification point when the LTE device may convey messages, if, for example, the traffic state changes. LTE may convey a signal to connectivity chip on the upcoming Tx and Rx traffic, if there is a change. Since the messages only reflect changes, the messages may not be communicated at every notification point.

According to one example embodiment, when LTE device or interface 28 reports its UL and DL activity to the connectivity chip over the Real Time (RT) coexistence interface 18, Bluetooth device or interface 14 knows if currently the LTE is in DL or UL and can also calculate internally when, for example, a change is expected to happen. The futuristic information can be deduced by the connectivity chip using current information, such as, for example, the LTE frame structure (TDD). The LTE frame structure may be semi-static and may be conveyed over a Non Real time (NRT) coexistence interface. However, the LTE subframe time may be fixed, such as, for example, about 1 millisecond (ms). There may be exceptions in TDD special subframes where the LTE Downlink Pilot Time Slot (DwPTS), Guard Period (GP), or Uplink Pilot Time Slot (UpPTS) times may be fixed, however, may be less than about 1 ms.

Futuristic information may also be deduced by the connectivity chip using information, such as, for example, LTE DL/UL frame and subframe boundaries information. According to this embodiment, the LTE frame start may be conveyed by the LTE or MWS device 28 to the connectivity chip over the RT coexistence interface 18. LTE subframe boundary may be tracked by the connectivity chip by tracking the time changes of the LTE DL/UL indication over the RT coexistence interface 18 and by knowing the subframe time is about 1 ms.

According to another example embodiment, futuristic information may be deduced by the connectivity chip using information, such as, for example, the LTE decision point or reporting time to the connectivity chip wherein the LTE DL/UL activity reporting point is fixed relative to the subframe boundary. One or more messages transmitted from the LTE or MWS device 28 to the Bluetooth device 14 may carry both static or semi-static traffic information as well as spontaneous traffic information. Static or semi-static information may include, for example, LTE frame structure, LTE traffic pattern and LTE inactivity durations. Together with the real time signaling of frame_sync, the connectivity chip can derive when some of the traffic may not happen. For example, frame structure message may be able to tell when the UL or the DL will not be happening, and the inactivity duration can indicate the period during which there is no UL and DL. For spontaneous traffic information, such as LTE DL/UL activity, the LTE or MWS device 28 may typically notify the connectivity side with advance signaling, i.e., the reporting time related to air time may be fixed. The fixed offsets may be conveyed through the NRT interface, for example, using MWS_Rx_Assert_Offset and MWS_Tx_Assert_Offset etc.

Figure 3:
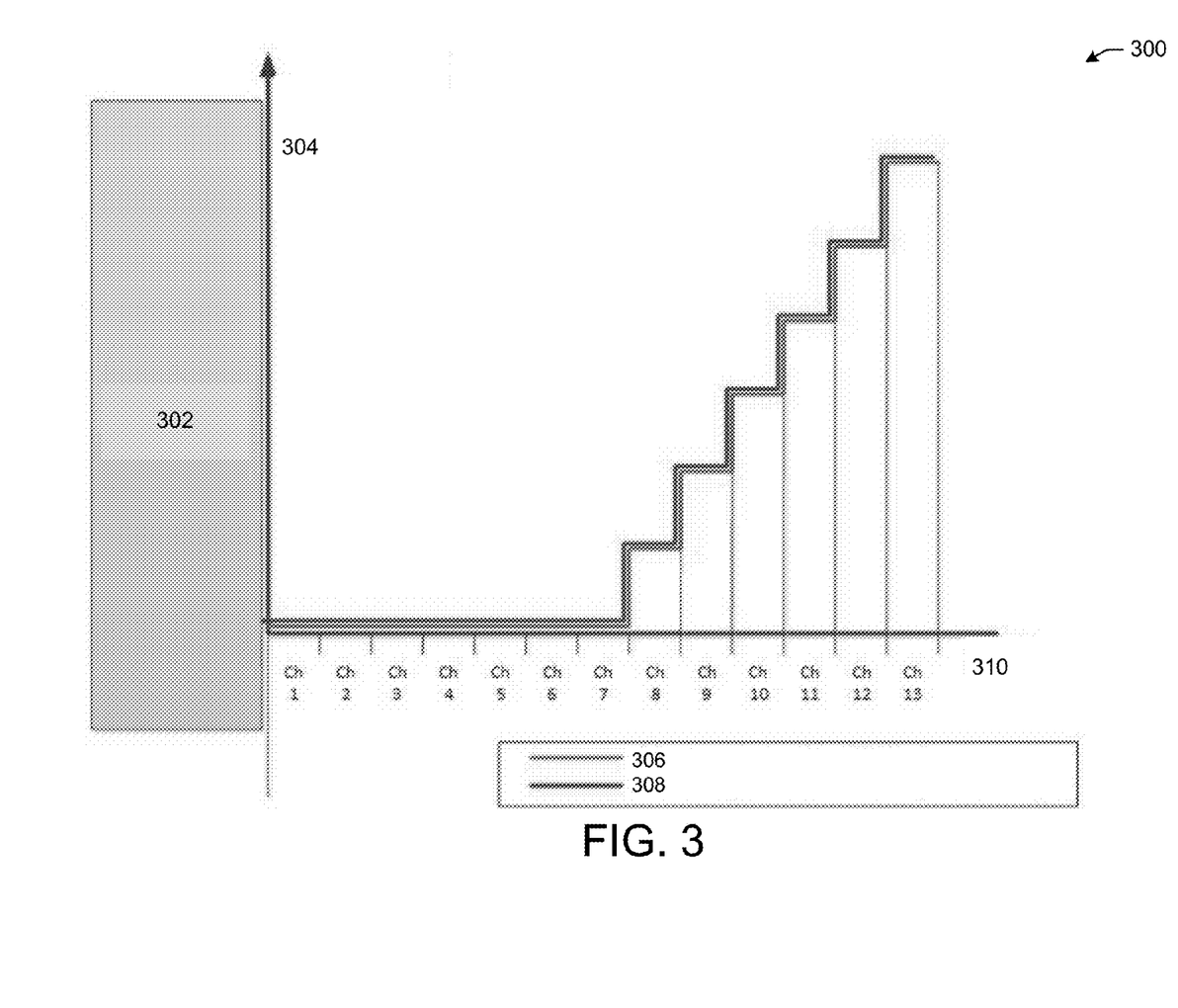
FIG. 3 illustrates an example LTE and Wi-Fi or Bluetooth spectrum map, according to one or more example embodiments

Turning now to FIG. 3, illustrated is an example method 300 for processing LTE and Wi-Fi or Bluetooth signals, according to one or more example embodiments. FIG. 3 also illustrates LTE modem and connectivity coexistence mechanisms, according to one or more example embodiments. One such channel to share slow changing information between the LTE modem and connectivity chip is the NRT interface or Non-Real Time interface. A NRT channel is, for example, an interface for the different communication devices, LTE, Bluetooth, and Wi-Fi to share slow changing information that can mitigate, for example, future coexistence issues. Wi-Fi and Bluetooth may be able to take advantage of additional NRT information which may be calculated in runtime, based at least in part on the actual link state algorithm, to perform coexistence decisions including (a) Wi-Fi and Bluetooth channel or Adaptive Frequency Hopping (AFH) selection based on modem calculated Rx or Tx indications and device geo location, (b) the maximum allowed transmit power per channel for Wi-Fi, and (c) the LTE modem connection state, for example, off/nonregistered/registered. The method 300 illustrated in FIG. 3 allows Wi-Fi and Bluetooth to plan their channel selection and coexistence behavior and make better decisions based on LTE modem runtime activity, UL/DL channel estimated and actual frequency, and the in-device interference level between the LTE and connectivity, for example.

FIG. 3 further illustrates one example method for Wi-Fi and Bluetooth channel or AFH selection based on LTE modem information, according to one or more example embodiments. In this method 300, Wi-Fi and Bluetooth preferred channel information may allow Wi-Fi and Bluetooth to choose, based at least in part on LTE coexistence information, the best operation channel and AFH map having least interference with the LTE modem UL/DL channel. According to this embodiment, a list of ISM frequency ranges or channels with LTE based Wi-Fi priorities may be reported to the Wi-Fi device or controller. The Y-axis in FIG. 3 indicates channel priority 304 and X-axis indicates, for example, the Wi-Fi channels 310. Based at least in part on the frequency priorities 304 and internal heuristics, the Wi-Fi device or controller may select LTE based operating channels that may have minimum interference between Wi-Fi and LTE. This method 300 may be implemented by Wi-Fi devices or controllers for all Wi-Fi MACs including Basic Service Sets (BSS), Peer to Peer (P2P), Software enabled Access Points (SoftAP) and Tunneled Direct Link Setup (TDLS), for example. The ISM frequency or channel priorities 304 may be based on at least two factors which may be updated dynamically based on the LTE modem state and location. The first one being Wi-Fi safe channel (Rx and Tx) vectors 306 and device geo location, and the second one being supported LTE bands 302 in the geo location. The device geo location may be based on the MCC (Mobile Country Code), provided by the modem or any other communication method, and the geo map table, which may be used to estimate the possible existing LTE bands in the current device country. Knowing the possible LTE bands 302 may assist Wi-Fi to select an operating channel 310 which may become a LTE or Wi-Fi safe channel 306 even before LTE has been registered to a base station. Geo location information based channel selection can assist the Wi-Fi device or controller to estimate which channels 310 will probably become "safe channels" 306 from the LTE modem coexistence manager's perspective, and therefore avoid channel switching at a later point or suffering from significant performance degradation due to high interference level between the communication devices. FIG. 3 shows the frequency priorities 304 based on device geo location. For example, LTE may be stationed on band 40 and therefore preferred Wi-Fi channels would be 9-13, while channels 1-8 may have zero priority.

Figure 4:
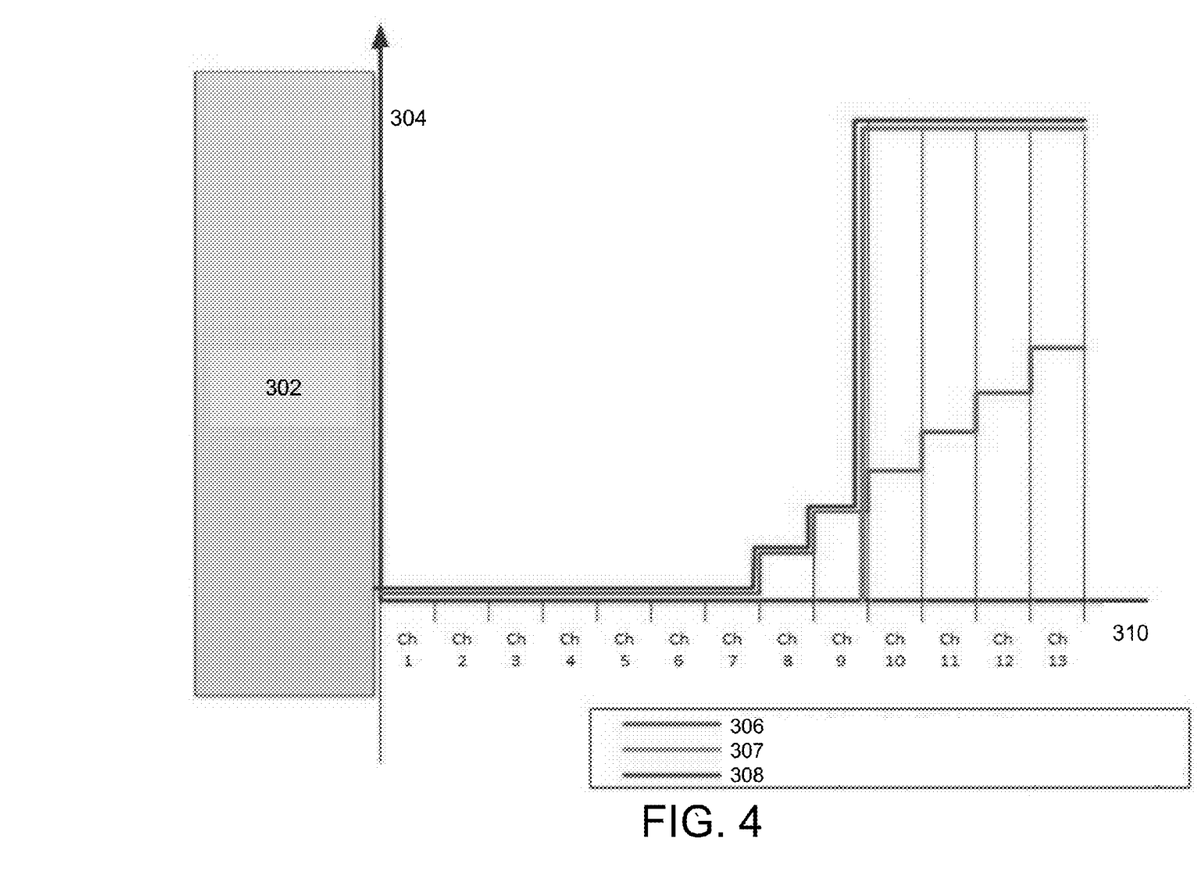
FIG. 4 illustrates an example LTE and Wi-Fi or Bluetooth spectrum map, according to one or more example embodiments

According to one or more example embodiments, such as shown in FIG. 4, Wi-Fi safe channels vector 307 may be calculated by the LTE modem based on its actual operating band channel and the LTE modem prospect of the interference level with the Wi-Fi. Wi-Fi safe channel 307 indication may be calculated at Wi-Fi Rx such that LTE UL does not de-sense Wi-Fi RX, and at Wi-Fi Tx such that Wi-Fi Tx does not de-sense LTE DL granularity with a single indication of safe or unsafe as per frequency range and as per channel. Wi-Fi safe channels 307 may be available only when the UE is registered to a base station and therefore combined with device geo location priorities as illustrated in FIG. 4, for example. Once actual, non-estimated, Wi-Fi safe channels are provided as 'Tx safe' and 'Rx safe' vectors, Wi-Fi frequency range/channels priorities may be updated such that the Tx safe and Rx safe channels have the highest priority while the rest of the channels have a lower priority based on both estimated and actual indications. An example for Wi-Fi channel selection is shown in FIGS. 3 and 4, for example.

It should be noted, however, that the same process described in the above embodiments may be applicable to Bluetooth when LTE modem may recommend on disqualified LTE/Bluetooth interfered channels in, for example, Bluetooth AFH channel map.

Figure 5:
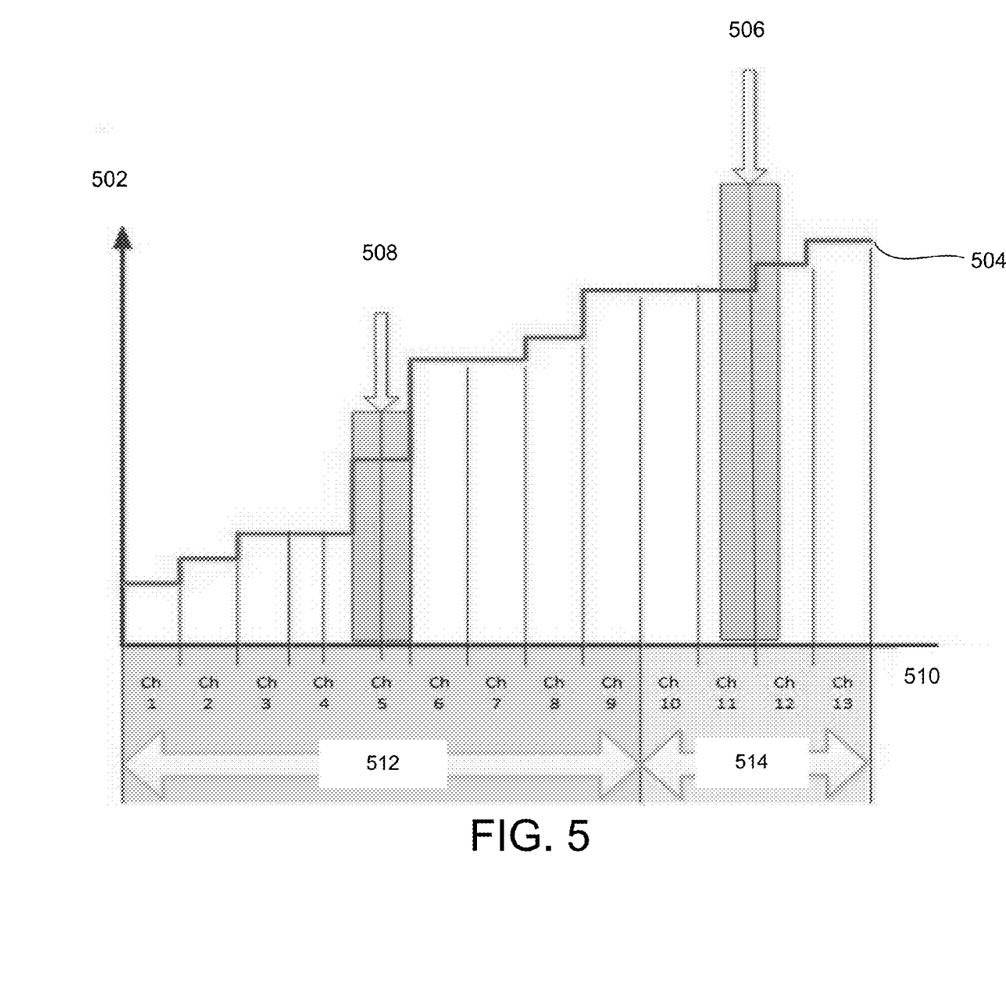
FIG. 5 illustrates an example LTE and Wi-Fi or Bluetooth spectrum map, according to one or more example embodiments

Turning now to FIG. 5, if Wi-Fi is operating in an unsafe channel 512, for example, in a non-Tx safe or non-Rx safe channel, in which Wi-Fi transmission may de-sense LTE DL, the Wi-Fi transmit power may not, for example, be allowed to exceed a certain power level without degrading the blocking LTE DL. The LTE modem may provide the maximum allowed Wi-Fi Tx output power 504 in each Wi-Fi channel 510 while taking into account that no LTE DL de-sense may be allowed. If Wi-Fi is able to operate with lower Tx output power, it may be able to operate in parallel to the LTE DL and may not require time division of the air. However, if the Wi-Fi Tx output power 506, 508 is above the maximum allowed Tx power 504, Wi-Fi Tx may require time division of the air, for example. It should be noted, however, that maximum allowed Tx power 504 can be overridden and optimized later on by an additional coexistence mechanism, for example.

In another embodiment, a further method for Wi-Fi or Bluetooth channel selection can be based on, for example, the LTE modem connection state. According to this example embodiment, the LTE modem may report its runtime connection state on the LTE network, for example, Off, Non-registered, Registered, to the connectivity chip. Connectivity may use that information to determine which of the RT mitigations should be activated, thus optimizing the typical LTE coexistence limitations based on the LTE state.

Figure 6:
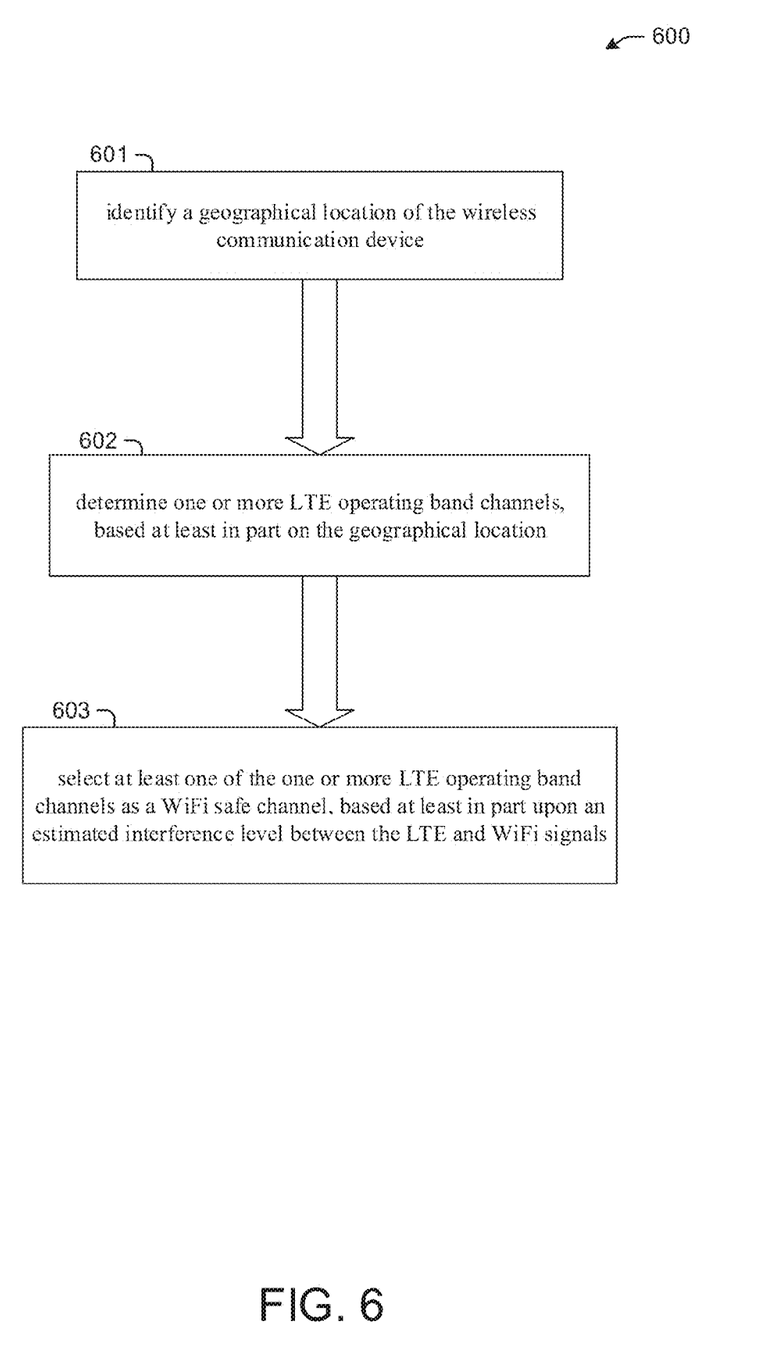
FIG. 6 illustrates operations in an example method for dynamic scheduling of Wi-Fi Bluetooth signals, according to one or more example embodiments.

FIG. 6 is an example of a flow diagram illustrating operations involved in an example dynamic Wi-Fi scheduling method 600, according to one or more example embodiments. The method 600 may be stored on a non-transitory computer readable medium and may be executed by a processor within the wireless communication device described in various embodiments disclosed herein. For example, in operation 601 the wireless communication device may identify its geographical location and determine its MCC. In operation 602, the wireless communication device may determine one or more LTE operating band channels, based at least in part on the geographical location. At operation 603, the wireless communication device may select at least one of the one or more LTE operating band channels as a Wi-Fi safe channel, based at least in part upon, for example, an estimated interference level between the LTE and Wi-Fi signals. It should be noted, however, that in some scenarios there may not be a 'safe' channel, but there may be channels that may be preferred over other, for example, not so safe channels. These channels are also referred to as 'safe' channels in the example embodiments above for the sake of consistency.

Accordingly, by dynamically changing the Wi-Fi and Bluetooth scheduling time, certain embodiments of the example systems, methods, and devices disclosed herein can optimize the Wi-Fi and Bluetooth traffic to avoid collision with any interfering LTE air traffic. In this manner, certain embodiments of the example systems, methods, and devices disclosed herein can therefore enhance the performance and save power consumption.

Figure 7:
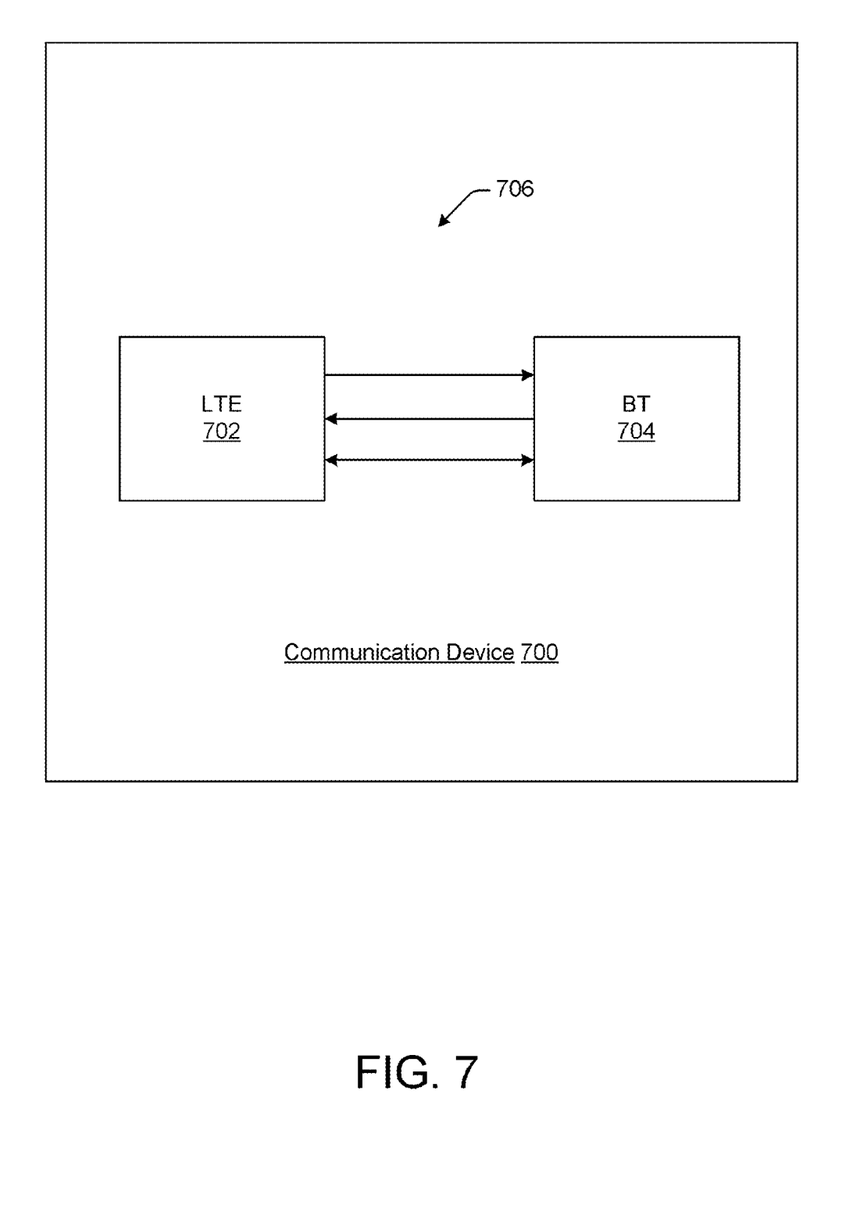
FIG. 7 illustrates an example wireless communication device, according to one or more example embodiments.

Referring to FIG. 7, shown is an example of a wireless communication device (or platform) 700 such as, for example a smart phone, a tablet, a phablet, a personal digital assistant, or other computing device that includes a cellular interface (or device) such as, e.g., LTE interface 702 collocated with a Bluetooth interface (or device) 704, according to one or more example embodiments of the present disclosure. The cellular interface (or device) can include processing circuitry capable of supporting cellular communications such as, e.g., LTE, 2G, 3G, 4G, or other cellular communication protocols. For example, the LTE interface 702 may include processing circuitry for one or more cellular transceiver(s) to support LTE communications. The Bluetooth interface (or device) 704 may include processing circuitry for one or more transceiver(s) to support Bluetooth communications. The communication device 700 may also include additional and/or combined interfaces (or devices) including processing circuitry to support other wireless communications such as, e.g., WLAN, WiMAX, global positioning system (GPS), near field communication (NFC), Neighborhood Area Network (NaN), etc.

In one or more embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions.

High speed signaling 706 may be provided between the LTE and Bluetooth interfaces (or devices) 702 and 704. Signaling may also be provided between the other interfaces (or devices) to allow for communications. Examples of the high speed signaling include an LTE frame synchronization (frame_synch) signal that indicates the frame synchronization with the base station, an LTE transmit (Tx) signal that indicates when the LTE interface 702 is or will be transmitting, LTE frame configuration information (e.g., config 0, config 1, config 2, etc.), and other signals and/or information. In some embodiments, the LTE and Bluetooth interfaces 702 and 704 may communicate with each other through, e.g., a two-wire bit pipe interface. The bit pipe interface may be a two-wire high speed universal asynchronous receiver/transmitter (HS_UART) with a baud rate of, e.g., 4 Mbps. Temperature and other operational conditions may also be communicated between the LTE and Bluetooth interfaces.

By knowing which LTE frame configuration being used and the LTE frame synchronization, the possibility of collisions between Bluetooth Rx and collocated LTE Tx can be deterministic. In some embodiments, the transmission power of the LTE interface (or device) 702 may be reduced during an LTE UL period to lower the bit error rate (BER) of Bluetooth packets that are received during the LTE UL period. For example, a 3 dB reduction may be possible when the LTE interface 702 is operating close to a base station. The Bluetooth interface 704 may send a request to the LTE interface 702 requesting a reduction in power during a specified time period. The request may specify, e.g., a time period based at least in part upon the LTE frame synchronization, corresponding to a LTE UL period, or corresponding to a Bluetooth frame or period. The request may also indicate a requested power reduction. The reduced LTE Tx power may allow the Bluetooth interface to receive packets during that time period with a lower BER. If the operational conditions permit, the LTE interface 702 may reduce the Tx power as requested or may adjust the Tx power to a level that does not impede LTE communications. The LTE interface may confirm the reduction or adjustment to the Bluetooth interface.

Figure 8:
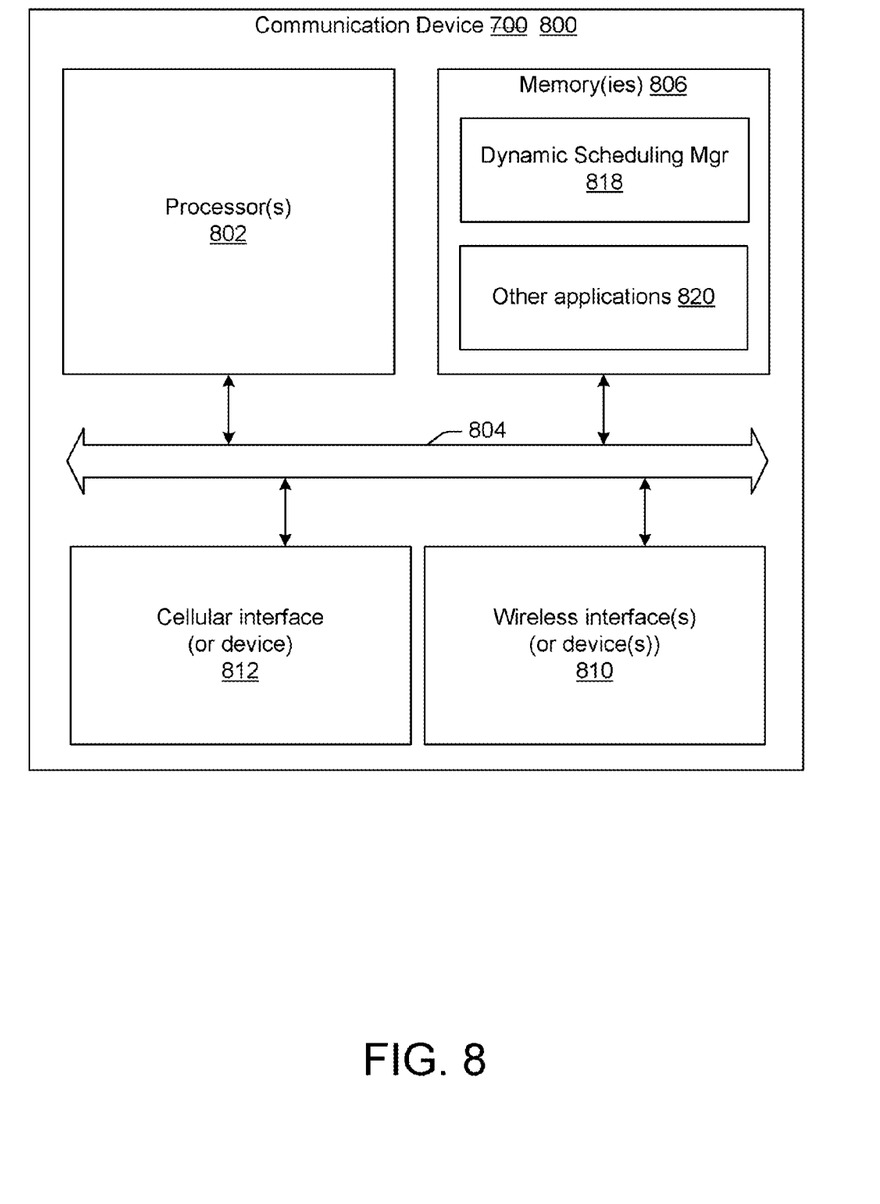
FIG. 8 illustrates an example wireless communication device, according to one or more example embodiments.

Turning now to FIG. 8, shown is a schematic block diagram of the wireless communication device 800 (shown in FIG. 8) in accordance with various embodiments of the present disclosure. The communication device 800 includes at least one processor circuit, for example, having a processor 802 and a memory 806, both of which are coupled to a local interface 804. The communication device 800 may include a cellular interface (or device) 812 such as, e.g., the LTE interface (or device) 702 of FIG. 7 and one or more wireless interface (or device) 810 including, e.g., the Bluetooth interface (or device) 704 of FIG. 7, all of which may be coupled to the local interface 804. The cellular interface (or device) 812 comprises processing circuitry for supporting cellular communications such as, e.g., LTE, 2G, 3G, 4G, WiMAX, WCDMA, HSDPA, WLAN or other wireless communication protocols. The wireless interface(s) (or device(s)) 810 comprise processing circuitry for supporting wireless communications such as, e.g., Bluetooth (Bluetooth), IEEE 802.11a/b/g/n, near field communication (NFC), global positioning system (GPS)/global navigation satellite system (GNSS), neighborhood area network (NaN) and/or other wireless communication protocols.

In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. In some cases, portions of the cellular interface (or device) 812 and/or wireless interface(s) (or device (s)) 810 may be implemented by processor 802 via local interface 804. The local interface 804 may comprise, for example, a data bus with an accompanying address/control bus or other bus structure as can be appreciated.

Stored in the memory 806 are both data and several components that are executable by the processor 802 and/or by processing circuitry of the cellular interface (or device) 812 and/or wireless interface(s) (or device(s)) 810. In particular, stored in the memory 806 and executable by the processor 802 may be a dynamic scheduling manager 818, and one or more other applications 820. In addition, an operating system may be stored in the memory 806 and executable by the processor 802. In some embodiments, the cellular interface (or device) 812 and/or wireless interface(s) (or device(s)) 810 may include memory for storing the dynamic scheduling manager 818. In some cases, the processor 802 and memory 806 may be integrated as a system-on-a-chip.

It is understood that there may be other applications that are stored in the memory and are executable by the processor 802, the cellular interface (or device) 812 and/or wireless interface(s) (or device(s)) 810 as can be appreciated. A number of software components may be stored in the memory and executable by the processor 802, the cellular interface (or device) 812 and/or wireless interface(s) (or device(s)) 810. In this respect, the term "executable" means a program file that is in a form that can ultimately be run by the processor 802, the cellular interface (or device) 812 and/or wireless interface(s) (or device(s)) 810. Examples of executable programs may be, for example, a compiled program that can be translated into machine code in a format that can be loaded into a random access portion of the memory 806 and run by the processor 802, source code that may be expressed in proper format such as object code that is capable of being loaded into a random access portion of the memory 806 and executed by the processor 802, or source code that may be interpreted by another executable program to generate instructions in a random access portion of the memory 806 to be executed by the processor 802, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 802 may represent multiple processors 802 and the memory 806 may represent multiple memories 806 that operate in parallel processing circuits, respectively. In such a case, the local interface 804 may be an appropriate network that facilitates communication between any two of the multiple processors 802, between any processor 802 and any of the memories 806, or between any two of the memories 806, etc. The local interface 804 may comprise additional systems designed to coordinate this communication, including, for example, performing load balancing. The processor 802 may be of electrical or of some other available construction.

Although the dynamic scheduling manager 818, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Based on the foregoing it should be apparent that the example embodiments of this disclosure provide a method, apparatus and computer program(s) to provide enhanced in-device coexistence for a user device that operates with a cellular network, such as the LTE network.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the dynamic scheduling manager 818 that comprises software or code can be embodied in any non-transitory computer-readable medium for use by or in connection with an instruction execution system such as, for example, a processor 802 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Example Embodiments

One example embodiment is a method for mitigating interference between LTE and Wi-Fi signals including identifying, by a wireless communication device, a geographical location of the wireless communication device, determining, by the wireless communication device, one or more LTE operating band channels, based at least in part on the geographical location, and selecting, by the wireless communication device, at least one of the one or more LTE operating band channels as a Wi-Fi safe channel, based at least in part upon an estimated interference level between the LTE and Wi-Fi signals.

Another example embodiment is a system including at least one wireless communication device comprising physical layer circuitry, one or more antennas, at least one memory, and one or more processing elements to identify a geographical location of the wireless communication device, determine one or more LTE operating band channels, based at least in part on the geographical location, and select at least one of the one or more LTE operating band channels as a Wi-Fi safe channel, based at least in part upon an estimated interference level between the LTE and Wi-Fi signals.

Another example embodiment is a wireless communication device including physical layer circuitry, one or more antennas, at least one memory, and one or more processing elements to identify a geographical location of the wireless communication device, determine one or more LTE operating band channels, based at least in part on the geographical location, and select at least one of the one or more LTE operating band channels as a Wi-Fi safe channel, based at least in part upon an estimated interference level between the LTE and Wi-Fi signals.

Another example embodiment is a non-transitory computer readable storage device including instructions stored thereon, which when executed by one or more processor(s) of a wireless communication device, cause the wireless communication device to perform operations of identifying a geographical location of the wireless communication device, determining one or more LTE operating band channels, based at least in part on the geographical location, and selecting at least one of the one or more LTE operating band channels as a Wi-Fi safe channel, based at least in part upon an estimated interference level between the LTE and Wi-Fi signals.

One example embodiment is a method for mitigating interference between LTE and Bluetooth signals including identifying, by a wireless communication device, a geographical location of the wireless communication device, determining, by the wireless communication device, one or more LTE operating band channels, based at least in part on the geographical location, and selecting, by the wireless communication device, at least one of the one or more LTE operating band channels as a Bluetooth safe channel, based at least in part upon an estimated interference level between the LTE and Bluetooth signals.

Another example embodiment is a system including at least one wireless communication device comprising physical layer circuitry, one or more antennas, at least one memory, and one or more processing elements to identify a geographical location of the wireless communication device, determine one or more LTE operating band channels, based at least in part on the geographical location, and select at least one of the one or more LTE operating band channels as a Bluetooth safe channel, based at least in part upon an estimated interference level between the LTE and Bluetooth signals.

Another example embodiment is a wireless communication device including physical layer circuitry, one or more antennas, at least one memory, and one or more processing elements to identify a geographical location of the wireless communication device, determine one or more LTE operating band channels, based at least in part on the geographical location, and select at least one of the one or more LTE operating band channels as a Bluetooth safe channel, based at least in part upon an estimated interference level between the LTE and Bluetooth signals.

Another example embodiment is a non-transitory computer readable storage device including instructions stored thereon, which when executed by one or more processor(s) of a wireless communication device, cause the wireless communication device to perform operations of identifying a geographical location of the wireless communication device, determining one or more LTE operating band channels, based at least in part on the geographical location, and selecting at least one of the one or more LTE operating band channels as a Bluetooth safe channel, based at least in part upon an estimated interference level between the LTE and Bluetooth signals.

Some examples in the Detailed Description may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples in the detailed description may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms used in the description and claims are not limited to their dictionary meanings, but, are merely used to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying, by a wireless communication device, a geographical location of the wireless communication device, based at least in part on a geographical map table corresponding to a mobile country code (MCC), wherein the geographical map table comprises geographical location information, received from an access point;
   determining, by the wireless communication device, one or more long term evolution (LTE) operating band channels and one or more wireless fidelity (Wi-Fi) operating band channels, based at least in part on the geographical location information; and
   selecting, by the wireless communication device, at least one first LTE operating band of the one or more LTE operating band channels as a Wi-Fi safe channel, based at least in part upon:
      an estimated performance degradation of the wireless communication device, associated with an estimated interference level between at least one LTE signal and at least one Wi-Fi signal, on the at least one, first LTE operating band of the one or more LTE operating band channels, or
      an estimate that the Wi-Fi safe channel will be switched, by the wireless communication device, to at least one second LTE operating band channel of the one or more LTE operating band channels.

2. The method of claim 1, further comprising:
determining, by the wireless communication device, the estimated interference level between the at least one LTE signal and at least one Wi-Fi signal using a downlink error rate.

3. The method of claim 1, wherein the selection is based at least in part upon dynamically scheduling, by the wireless communication device, transmissions of the at least one LTE signal or the at least one Wi-Fi signal, from a LTE radio or a Wi-Fi radio.

4. The method of claim 1, further comprising:
receiving, by the wireless communication device, LTE information of the one or more LTE operating band channels, the LTE information comprising real time (RT) and non-real time (NRT) messages.

5. A wireless communication device comprising:
at least one memory comprising computer-executable instructions stored thereon; and
one or more processing elements to execute the computer-executable instructions to:
identify a geographical location of the wireless communication device, based at least in part on a geographical map table corresponding to a mobile country code (MCC), wherein the geographical map table comprises geographical location information, received from an access point;
determine one or more long term evolution (LTE) operating band channels and one or more wireless fidelity (Wi-Fi) operating band channels based at least in part on the geographical location; and
select at least one first LTE operating band channel of the one or more LTE operating band channels as a Wi-Fi safe channel, based at least in part upon:
an estimated performance degradation of the wireless communication device, associated with an estimated interference level between at least one LTE signal from the access point and at least one Wi-Fi signal, on the at least one first LTE operating band channel of the one or more LTE operating band channels, or
an estimate that the Wi-Fi safe channel will be switched, by the wireless communication device, to at least one second LTE operating band channel of the one or more LTE operating band channels.

6. The device of claim 5, wherein a Wi-Fi device or a LTE device in the wireless communication device communicates via a mobile wireless standards (MWS) coexistence transport interface.

7. The device of claim 5, wherein a Wi-Fi device or a LTE device in the wireless communication device communicates via a Wi-Fi host interface.

8. The device of claim 5, wherein the one or more processing elements execute the computer-executable instructions that further cause the one or more processing elements to:
receive LTE information of the one or more LTE operating band channels, wherein the LTE information comprises real time (RT) and non-real time (NRT) messages.

9. A non-transitory computer readable storage device including instructions stored thereon, which when executed by one or more processor(s) of a wireless communication device, cause the wireless communication device to perform operations of:
identifying a geographical location of the wireless communication device, based at least in part on a geographical map table corresponding to a mobile country code (MCC), wherein the geographical map table comprises geographical location information, received from an access point;
determining one or more long term evolution (LTE) operating band channels and one or more wireless fidelity (Wi-Fi) operating band channels, based at least in part on the geographical location; and
selecting at least one first LTE operating band of the one or more LTE operating band channels as a Wi-Fi safe channel, based at least in part upon:
an estimated performance degradation of the wireless communication device, associated with an estimated interference level between at least one LTE signal from the access point and at least one Wi-Fi signal, on the at least one first LTE operating band channel, of the one or more LTE operating band channels, or
an estimate that the Wi-Fi safe channel will be switched, by the wireless communication device, to at least one second LTE operating band channel of the one or more LTE operating band channels.

10. The device of claim 9, wherein a Wi-Fi device or LTE device in the wireless communication device communicates via a mobile wireless standards (MWS) coexistence transport interface.

11. The device of claim 9, wherein a Wi-Fi device or LTE device in the wireless communication device communicates via a Wi-Fi host interface.

12. The device of claim 9, wherein the one or more processor(s) of the wireless communication device execute the instructions to cause the wireless communication device to further perform operations of:
receiving LTE information of the one or more LTE operating band channels, wherein the LTE information comprises real time (RT) and non-real time (NRT) messages.

13. A method comprising:
identifying, by a wireless communication device, a geographical location of the wireless communication device, based at least in part on a geographical map table corresponding to a mobile country code (MCC), wherein the geographical map table comprises geographical location information, received from an access point;
determining, by the wireless communication device, one or more long term evolution (LTE) operating band channels, based at least in part on the geographical location; and
selecting, by the wireless communication device, at least one first LTE operating band channel of the one or more LTE operating band channels as a Bluetooth safe channel, based at least in part upon:
an estimated performance degradation of the wireless communication device, associated with an estimated interference level between at least one LTE signal from the access point and at least one Bluetooth signal, on the at least one first LTE operating band channel, of the one or more LTE operating band channels, or
an estimate that the Bluetooth safe channel will be switched, by the wireless communication device, to at least one second LTE operating band channel of the one or more LTE operating band channels.

14. The method of claim 13, further comprising:
determining, by the wireless communication device, the estimated interference level between the at least one LTE signal from the access point and at least one Bluetooth signal using a downlink error rate.

15. The method of claim 13, wherein the selecting is based at least in part upon dynamically scheduling, by the wireless communication device, transmissions of the at least one LTE signal or the at least one Wi-Fi signal, from a LTE radio or a Wi-Fi radio.

16. The method of claim 13, further comprising:
receiving, by the wireless communication device, LTE information of the one or more LTE operating band channels, the LTE information comprising real time (RT) and non-real time (NRT) messages.

17. A wireless communication device comprising:
at least one memory comprising computer-executable instructions stored thereon; and
one or more processing elements to execute the computer-executable instructions to:
identify a geographical location of the wireless communication device, based at least in part on a geographical map table corresponding to a mobile country code (MCC), wherein the geographical map table comprises geographical location information, received from an access point;
determine one or more long term evolution (LTE) operating band channels, based at least in part on the geographical location; and
select at least one first LTE operating band channel of the one or more LTE operating band channels as a Bluetooth safe channel, based at least in part upon:
an estimated performance degradation of the wireless communication device, associated with an estimated interference level between at least one LTE signal from the access point and at least one Bluetooth signal, on the at least one first LTE operating band channel, of the one or more LTE operating band channels, or
an estimate that the Bluetooth safe channel will be switched, by the wireless communication device, to at least one second LTE operating band channel of the one or more LTE operating band channels.

18. The device of claim 17, wherein a Bluetooth device or a LTE device in the wireless communication device communicates via a mobile wireless standards (MWS) coexistence transport interface.

19. The device of claim 17, wherein a Bluetooth device or a LTE device in the wireless communication device communicates via a Bluetooth host interface.

20. The device of claim 17, wherein the one or more processing elements execute the computer-executable instructions that further cause the one or more processing elements to:
receive LTE information of the one or more LTE operating band channels, wherein the LTE information comprises real time (RT) and non-real time (NRT) messages.

21. A non-transitory computer readable storage device including instructions stored thereon, which when executed by one or more processor(s) of a wireless communication device, cause the wireless communication device to perform operations of:
identifying a geographical location of the wireless communication device, based at least in part on a geographical map table corresponding to a mobile country code (MCC), wherein the geographical map table comprises geographical location information, received from an access point;
determining one or more long term evolution (LTE) operating band channels, based at least in part on the geographical location; and
selecting at least one first LTE operating band channel of the one or more LTE operating band channels as a Bluetooth safe channel, based at least in part upon:
an estimated performance degradation of the wireless communication device, associated with an estimated interference level between at least one LTE signal from the access point and at least one Bluetooth signal, on the at least one first LTE operating band, of the one or more LTE operating band channels, or
an estimate that the Bluetooth safe channel will be switched, by the wireless communication device, to at least one second LTE operating band channel of the one or more LTE operating band channels.

22. The device of claim 21, wherein a Bluetooth device or a LTE device in the wireless communication device communicates via a mobile wireless standards (MWS) coexistence transport interface.

23. The device of claim 21, wherein a Bluetooth device or a LTE device in the wireless communication device communicates via a Bluetooth host interface.

24. The device of claim 21, wherein the one or more processor(s) of the wireless communication device execute the instructions to cause the wireless communication device to further perform operations of:
receiving LTE information of the one or more LTE operating band channels, wherein the LTE information comprises real time (RT) and non-real time (NRT) messages.

* * * * *